United States Patent
Tsuchitoi

(10) Patent No.: US 11,295,005 B2
(45) Date of Patent: Apr. 5, 2022

(54) INFORMATION PROCESSING APPARATUS CAPABLE OF DETECTING ALTERATION, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Naoki Tsuchitoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/579,094

(22) Filed: Sep. 23, 2019

(65) Prior Publication Data
US 2020/0097647 A1 Mar. 26, 2020

(30) Foreign Application Priority Data
Sep. 26, 2018 (JP) .............................. JP2018-179774

(51) Int. Cl.
| | | |
|---|---|---|
| G06F 21/00 | (2013.01) | |
| G06F 21/44 | (2013.01) | |
| G06F 21/57 | (2013.01) | |
| G06F 21/62 | (2013.01) | |
| G06F 21/64 | (2013.01) | |
| G06F 21/51 | (2013.01) | |
| H04L 9/32 | (2006.01) | |
| H04N 1/00 | (2006.01) | |
| G06F 8/61 | (2018.01) | |

(52) U.S. Cl.
CPC ............ *G06F 21/51* (2013.01); *G06F 21/572* (2013.01); *H04L 9/3239* (2013.01); *H04L 9/3247* (2013.01); *H04N 1/00037* (2013.01); *H04N 1/00074* (2013.01); *H04N 1/00938* (2013.01); *G06F 8/61* (2013.01); *G06F 2221/033* (2013.01)

(58) Field of Classification Search
USPC .................................................. 717/100–178
See application file for complete search history.

(56) References Cited

U.S. PATENT DOCUMENTS

| | | | | |
|---|---|---|---|---|
| 6,976,163 | B1 * | 12/2005 | Hind ..................... | G06F 21/572 713/1 |
| 8,819,827 | B1 * | 8/2014 | Easttom ................. | G06F 21/51 726/24 |
| 9,021,568 | B2 * | 4/2015 | Yamaguchi ............. | G06F 21/44 726/7 |
| 9,904,535 | B2 * | 2/2018 | Gross ....................... | H04B 3/52 |
| 2006/0143600 | A1 * | 6/2006 | Cottrell ................. | G06F 21/572 717/168 |

(Continued)

FOREIGN PATENT DOCUMENTS

JP 2008-244992 A 10/2008

*Primary Examiner* — Marcellus J Augustin
(74) *Attorney, Agent, or Firm* — Canon U.S.A., Inc. IP Division

(57) ABSTRACT

An information processing apparatus includes an installation unit that installs a first program after overwriting the first program so as to make the first program compatible with an operational environment on the information processing apparatus. A generation unit is included to generate first verification data based on the first program overwritten by the installation unit. A first detection unit is also included to detect an alteration to the first program after the installation based on the first verification data generated by the generation unit.

18 Claims, 7 Drawing Sheets

(56) References Cited

U.S. PATENT DOCUMENTS

| | | | |
|---|---|---|---|
| 2010/0023777 A1* | 1/2010 | Prevost | G06F 21/572 |
| | | | 713/180 |
| 2010/0175061 A1* | 7/2010 | Maeda | G06F 8/65 |
| | | | 717/173 |
| 2012/0178367 A1* | 7/2012 | Matsumoto | G06K 19/0712 |
| | | | 455/41.1 |
| 2013/0047143 A1* | 2/2013 | Chalmers | G06F 21/572 |
| | | | 717/168 |
| 2013/0047144 A1* | 2/2013 | Chalmers | G06F 21/51 |
| | | | 717/168 |
| 2014/0132973 A1* | 5/2014 | Yamashita | H04N 1/00928 |
| | | | 358/1.13 |
| 2014/0196134 A1* | 7/2014 | Yamaguchi | G06F 21/44 |
| | | | 726/7 |
| 2014/0279985 A1* | 9/2014 | Fontenot | G06F 8/65 |
| | | | 707/698 |
| 2015/0203313 A1* | 7/2015 | Kaiser | B65H 16/005 |
| | | | 242/562 |
| 2016/0234396 A1* | 8/2016 | Yasukawa | B41J 29/38 |
| 2016/0234625 A1* | 8/2016 | Wang | H04L 67/06 |
| 2017/0010881 A1* | 1/2017 | Kawazu | G06F 8/65 |
| 2019/0065171 A1* | 2/2019 | Zimmermann | G06F 21/57 |

* cited by examiner

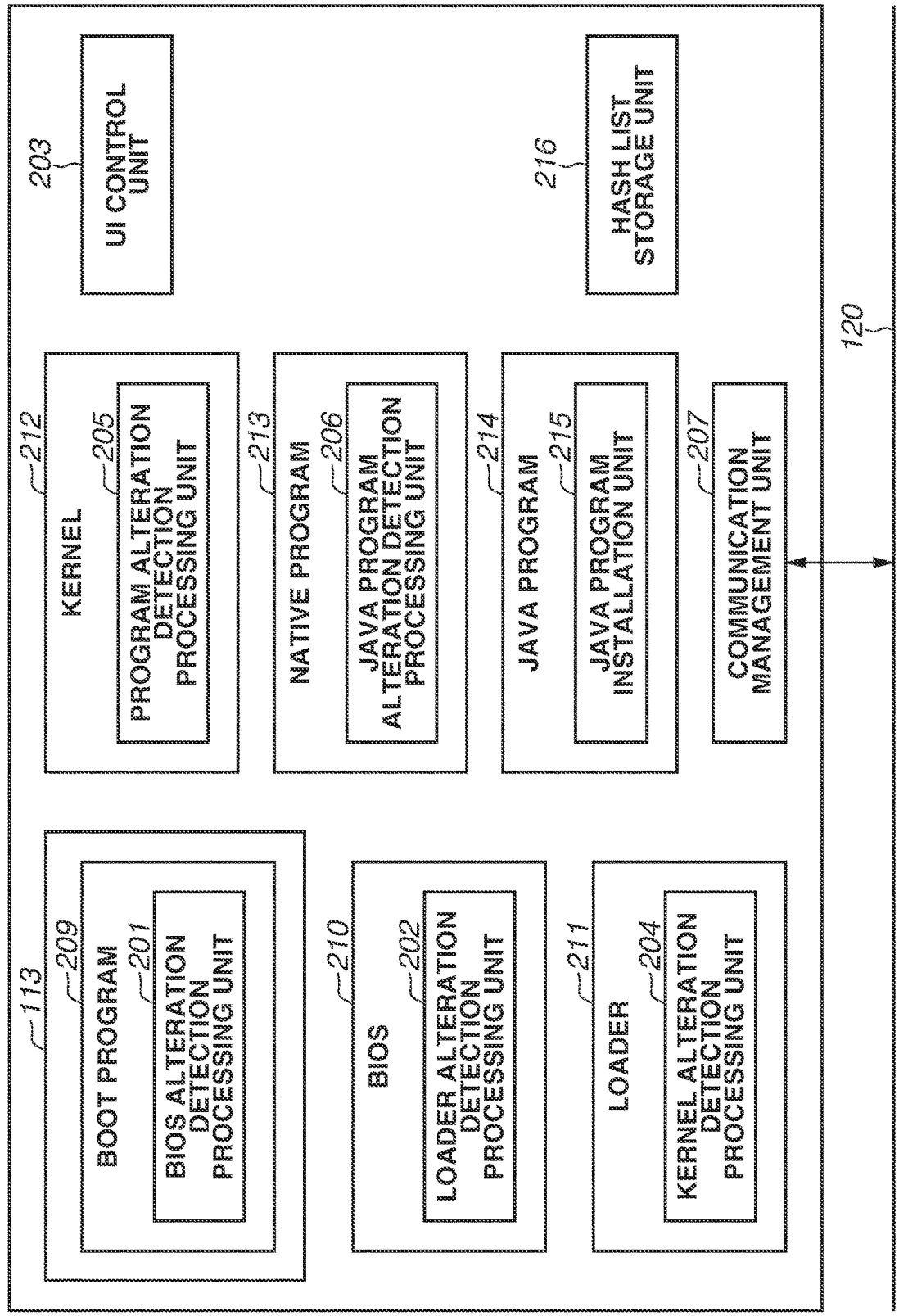

INFORMATION PROCESSING APPARATUS CAPABLE OF DETECTING ALTERATION, METHOD FOR CONTROLLING INFORMATION PROCESSING APPARATUS, AND STORAGE MEDIUM

BACKGROUND

Field

The present disclosure relates to an information processing apparatus capable of detecting an alteration, a method for controlling an information processing apparatus, and a medium storing a program.

Description of the Related Art

An attack attempting to tamper and alter software by taking advantage of vulnerability of the software and misuse a computer has been becoming a problem.

Japanese Patent Application Laid-Open No. 2008-244992 discusses a terminal apparatus including a tamper-resistant module equipped with a first flash memory and a first central processing unit (CPU), and a main body unit equipped with a second flash memory and a second CPU. The first flash memory stores therein a hash value of a boot unit including a preset boot program. The first CPU calculates a hash value of the input boot unit, determines whether the calculated hash value of the boot unit and the above-described stored hash value of the boot unit match each other, and outputs a result of the determination. The second flash memory stores the boot unit therein. The second CPU inputs the boot unit to the first CPU and acquires the result of the determination, and sets permission to an operation of the terminal apparatus accompanied by the use of the boot unit if the result of the determination indicates that the hash values match each other, by executing the program stored in the boot unit.

Conventionally, a digital signature has been added to all programs (software) in an information processing apparatus with use of a private key at the stage of distribution thereof. Therefore, any kind of overwrite after the distribution of the program has been deemed as an alteration.

SUMMARY

According to an aspect of the present disclosure, an information processing apparatus includes an installation unit configured to install a first program after overwriting the first program so as to make the first program compatible with an operational environment on the information processing apparatus, a generation unit configured to generate first verification data based on the first program overwritten by the installation unit, and a first detection unit configured to detect an alteration to the first program after the installation based on the first verification data generated by the generation unit.

Further features of the present disclosure will become apparent from the following description of exemplary embodiments with reference to the attached drawings.

BRIEF DESCRIPTION OF THE DRAWINGS

FIG. 2 illustrates one example of a software configuration of the multifunction peripheral.

DESCRIPTION OF THE EMBODIMENTS

Figure 1:
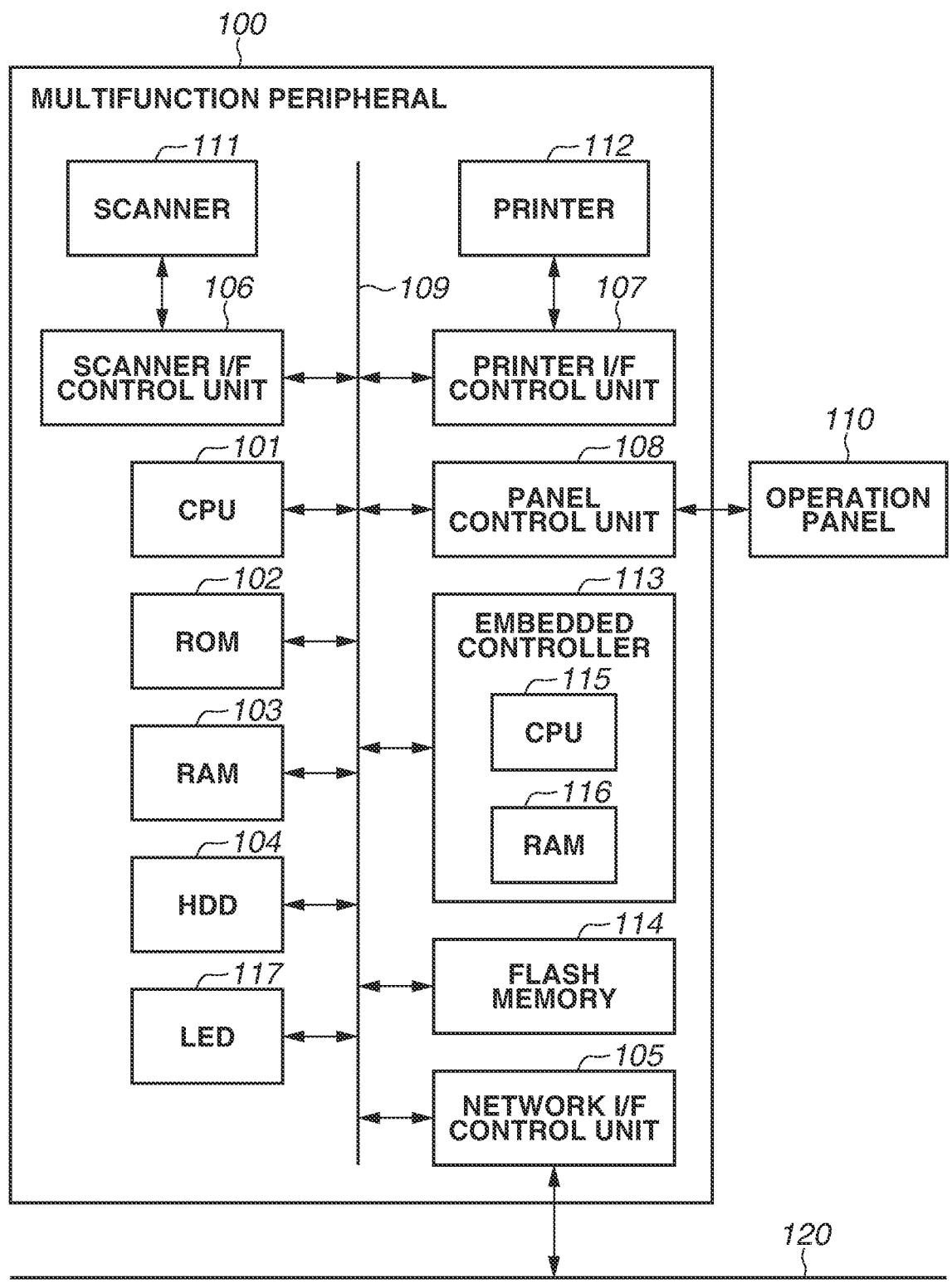
FIG. 1 illustrates one example of a hardware configuration of a multifunction peripheral.

A first exemplary embodiment will be described. A hardware configuration of a multifunction peripheral 100 will be described with reference to FIG. 1. FIG. 1 illustrates one example of the hardware configuration of the multifunction peripheral 100. The multifunction peripheral 100 is one example of an information processing apparatus.

A central processing unit (CPU) 101 executes a program (software) of the multifunction peripheral 100 and controls the multifunction peripheral 100.

A read only memory (ROM) 102 stores therein a basic input/output system (BIOS), a fixed parameter, and the like of the multifunction peripheral 100.

The program that the CPU 101 executes when controlling the multifunction peripheral 100 is loaded into a random access memory (RAM) 103. The RAM 103 stores temporary data and the like therein.

A hard disk drive (HDD) 104 stores a part of application programs and various kinds of data therein.

A flash memory 114 stores a loader 211, a kernel 212, a native program 213, and the like therein. The ROM 102, the HDD 104, and the flash memory 114 are each one example of a storage medium.

An embedded controller 113 includes a CPU 115 and a RAM 116. The CPU 115 executes a program of the embedded controller 113, and is in charge of a part of the control in the multifunction peripheral 100. The program that the CPU 115 executes when controlling the multifunction peripheral 100 is loaded into the RAM 116. The RAM 116 stores temporary data and the like therein.

A network interface (I/F) control unit 105 controls transmission/reception of data to/from an external apparatus via a network 120.

A scanner I/F control unit 106 controls a scanner 111 so as to cause the scanner 111 to, for example, read out an original document.

A printer I/F control unit 107 controls a printer 112 so as to cause the printer 112 to perform, for example, print processing.

A panel control unit 108 controls a touch panel-type operation panel 110 so as to cause it to, for example, display various kinds of information and receive an instruction from a user.

A bus 109 connects the CPU 101, the ROM 102, the RAM 103, the HDD 104, the network I/F control unit 105, the scanner I/F control unit 106, and the printer I/F control unit 107 to one another. The bus 109 further connects the panel control unit 108, the embedded controller 113, the flash memory 114, and a light-emitting diode (LED) 117 to one another. A control signal from the CPU 101 and a data signal between the individual units are transmitted and received via the bus 109.

The LED 117 is lightened up based on the control by the CPU 101, and is used to notify the outside of an abnormality in the program and the hardware.

Next, a software configuration of the multifunction peripheral 100 will be described with reference to FIG. 2. FIG. 2 illustrates one example of the software configuration of the multifunction peripheral 100.

A communication management unit 207 transmits/receives the data to/from the external apparatus via the network 120 by controlling the network I/F control unit 105 connected to the network 120.

A user interface (UI) control unit 203, for example, receives an input onto the operation panel 110 via the panel control unit 108, and performs processing according to the input and outputs a screen to the operation panel 110.

A boot program 209 is a program executed by the CPU 115 of the embedded controller 113 when the multifunction peripheral 100 is powered on. The boot program 209 performs processing regarding the startup of the multifunction peripheral 100. Further, the boot program 209 includes a BIOS alteration detection processing unit 201, which detects an alteration to the BIOS.

A BIOS 210 is a program executed by the CPU 101 after the boot program 209 is executed. The BIOS 210 performs processing regarding the startup of the multifunction peripheral 100. Further, the BIOS 210 includes a loader alteration detection processing unit 202, which detects an alteration to the loader 211.

The loader 211 is a program executed by the CPU 101 after the processing by the BIOS 210 is ended. The loader 211 performs processing regarding the startup of the multifunction peripheral 100. Further, the loader 211 includes a kernel alteration detection processing unit 204, which detects an alteration to the kernel 212.

The kernel 212 is a program executed by the CPU 101 after the processing by the loader 211 is ended. The kernel 212 performs processing regarding the startup of the multifunction peripheral 100. Further, the kernel 212 includes a program alteration detection processing unit 205, which detects an alteration to the native program 213.

The native program 213 is a program executed by the CPU 101. The native program 213 includes a plurality of programs that provides various functions in collaboration with a Java (registered trademark) program 214 in the multifunction peripheral 100. Examples of the native program 213 include a program that controls the scanner I/F control unit 106 and the printer I/F control unit 107, and a startup program. The startup processing is performed by calling the startup program from the native program 213 by the kernel 212. This startup processing includes a startup of the Java program 214, processing for making the operation panel 110 operable, processing for making the printer 112 and the scanner 111 ready to operate, processing for allowing data to be transmitted and received via the network 120, and the like. Further, there is a Java program alteration detection processing unit 206, which detects an alteration to the Java program 214, as one program included in the native program 213.

The Java program 214 is a program executed by the CPU 101. The Java program 214 is a program that provides various functions in collaboration with the native program 213 in the multifunction peripheral 100 (for example, a program that displays a screen on the operation panel 110). There is a Java program installation unit 215 as the Java program 214. The Java program installation unit 215 is a program that installs the Java program 214. Normally, the Java program 214 cannot be installed without intervention of the Java program installation unit 215.

A hash list storage unit 216 is a list generated on a nonvolatile memory such as the HDD 104, and is a file storing a hash value of the Java program 214 therein. A hash list 310, which will be described below, is stored in the hash list storage unit 216.

Figure 3A:
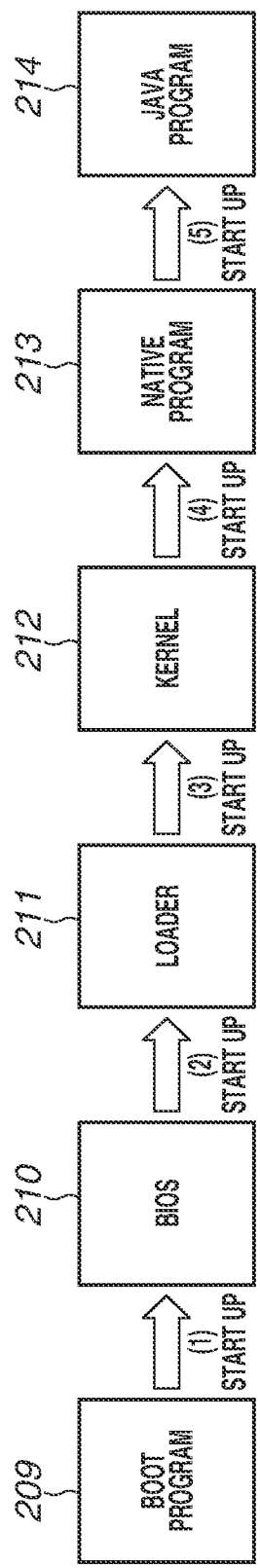
FIGS. 3A and 3B each illustrate an example of a flow of processing for starting up the multifunction peripheral.

Next, a flow of processing for starting up the multifunction peripheral 100 without carrying out alteration detection will be described with reference to FIG. 3A. FIG. 3A is a schematic view illustrating one example of the flow of the processing for starting up the multifunction peripheral 100.

As illustrated in FIG. 3A, when the multifunction peripheral 100 is started up, the boot program 209 is started up. Then, the boot program 209 starts up the BIOS 210. The BIOS 210 starts up the loader 211. The loader 211 starts up the kernel 212. Then, the kernel 212 starts up the startup program included in the native program 213. Then, the Java program 214 is started up in the startup program, and, after that, the native program 213 and the Java program 214 provide the function of the multifunction peripheral 100 in collaboration with each other.

Figure 3B:
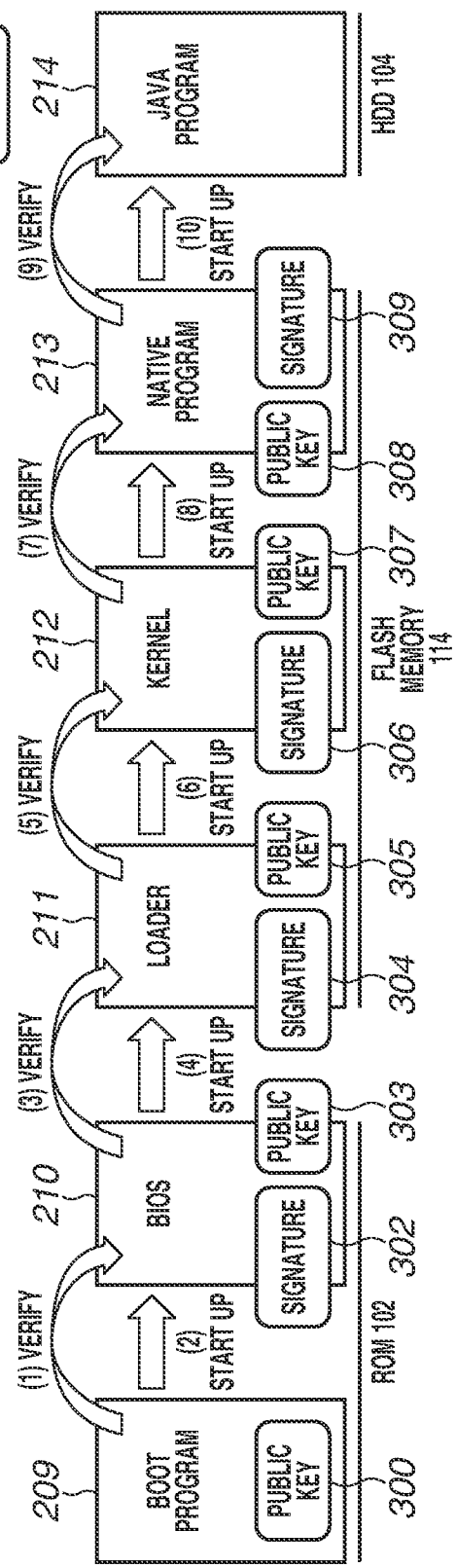

Next, a flow of processing for starting up the multifunction peripheral 100 while carrying out the alteration detection will be described with reference to FIG. 3B. FIG. 3B is a schematic view illustrating one example of the flow of the processing for starting up the multifunction peripheral 100. FIG. 3B illustrates a location where each of the programs is stored, and a location where a digital signature (hereinafter referred to as a signature) and a public key are stored. Hereinafter, the description will continue, assuming that the boot program 209 and the BIOS 210 are stored in the ROM 102, the loader 211, the kernel 212, and the native program 213 are stored in the flash memory 114, and the Java program 214 is stored in the HDD 104.

A public key 300 for verifying a BIOS signature is included in the boot program 209. A BIOS signature 302 and a loader verification public key 303 are included in the BIOS 210. A loader signature 304 and a kernel verification public key 305 are included in the loader 211. A kernel signature 306 and a native program verification public key 307 are included in the kernel 212. A Java program verification public key 308 and a native program signature 309 are included in the native program 213. Assume that these public keys and signatures described here have been added to the respective programs in advance before the multifunction peripheral 100 has been shipped out.

As illustrated in FIG. 3B, when the multifunction peripheral 100 is started up, the boot program 209 is started up. The BIOS alteration detection processing unit 201 in the boot program 209 attempts to verify the BIOS 210, and the boot program 209 starts up the BIOS 210 if no problem arises therewith. The loader alteration detection processing unit 202 in the BIOS 210 attempts to verify the loader 211, and the BIOS 210 starts up the loader 211 if no problem arises therewith. The kernel alteration detection processing unit 204 in the loader 211 attempts to verify the kernel 212, and the loader 211 starts up the kernel 212 if no problem arises therewith. The program alteration detection processing unit 205 in the kernel 212 attempts to verify the native program 213, and the kernel 212 starts up the native program 213 if no problem arises therewith. The Java program alteration detection processing unit 206 in the native program 213 attempts to verify the Java program 214, and the native program 213 starts up the Java program 214 if no problem arises therewith.

Figure 4:
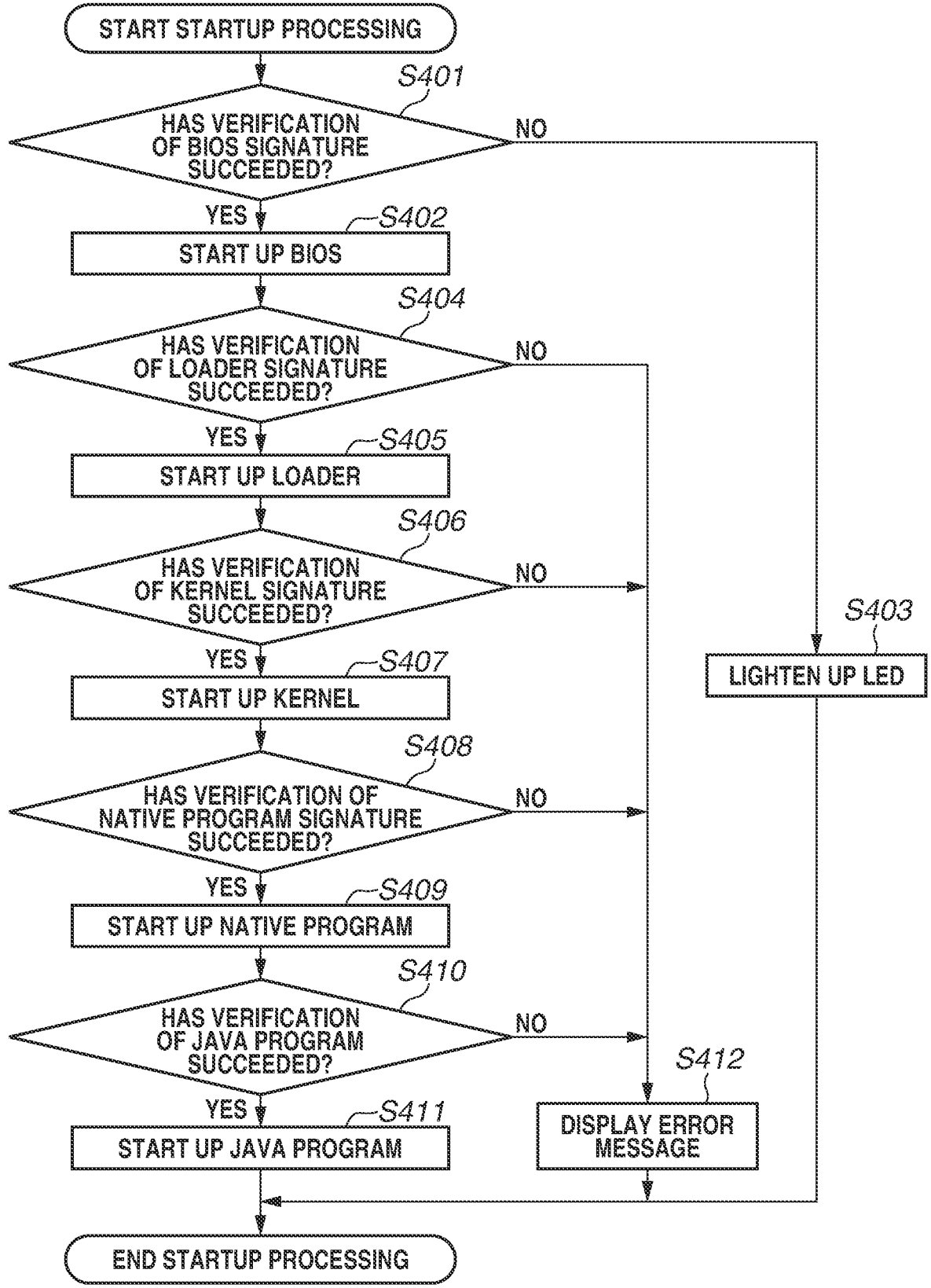
FIG. 4 is a flowchart illustrating one example of the processing for starting up the multifunction peripheral.

Next, details of the processing illustrated in FIG. 3B will be described with reference to FIG. 4. FIG. 4 is a flowchart illustrating one example of the processing for starting up the multifunction peripheral 100.

When the multifunction peripheral 100 is powered on, the boot program 209 is read in from the ROM 102 into the RAM 116 and is executed by the CPU 115. The BIOS alteration detection processing unit 201 included in the boot program 209 reads in the BIOS 210, the loader verification public key 303, and the BIOS signature 302 from the flash memory 114 into the RAM 116. Then, processing in step S401 is performed.

In step S401, the BIOS alteration detection processing unit 201 attempts to verify the BIOS signature 302 with use of the public key 300 for verifying the BIOS 210, and determines whether the verification of the BIOS signature 302 has succeeded. If determining that the verification of the BIOS signature 302 has succeeded (YES in step S401), the BIOS alteration detection processing unit 201 supplies power to the CPU 101, and ends the processing by the boot program 209 while the processing illustrated in FIG. 4 proceeds to step S402. The success in the verification of the BIOS signature 302 corresponds to no alteration found out in the BIOS 210. If determining that the verification of the BIOS signature 302 has failed (NO in step S401), in step S403, the BIOS alteration detection processing unit 201 issues a notification indicating that an alteration to the BIOS 210 is detected by lightening up the LED 117, and ends the processing illustrated in FIG. 4.

When power is supplied to the CPU 101, in step S402, the CPU 101 reads in the BIOS 210 and the loader verification public key 303 from the ROM 102 into the RAM 103, and starts up the BIOS 210. The processing illustrated in FIG. 4 that will be described hereinafter is entirely processed by the CPU 101.

When being started up, the BIOS 210 performs various kinds of initialization processing, and the loader alteration detection processing unit 202 included in the BIOS 210 reads in the loader 211, the kernel verification pubic key 305, and the loader signature 304 from the flash memory 114 into the RAM 103.

In step S404, the loader alteration detection processing unit 202 attempts to verify the loader signature 304 with use of the loader verification public key 303, and determines whether the verification of the loader signature 304 has succeeded. If determining that the verification of the loader signature 304 has failed (NO in step S404), in step S412, the loader alteration detection processing unit 202 issues a notification indicating that an alteration to the loader 211 is detected by displaying an error message on the operation panel 110, and ends the processing illustrated in FIG. 4. If determining that the verification of the loader signature 304 has succeeded (YES in step S404), the loader alteration detection processing unit 202 ends the processing thereof while the processing illustrated in FIG. 4 proceeds to step S405. The success in the verification of the loader signature 304 corresponds to no alteration found out in the loader 211.

In step S405, the BIOS 210 starts up the loader 211 read in the RAM 103. When being started up, the loader 211 performs various kinds of initialization processing. Next, the kernel alteration detection processing unit 204 included in the loader 211 reads in the kernel 212, the native program verification public key 307, and the kernel signature 306 from the flash memory 114 into the RAM 103.

In step S406, the kernel alteration detection processing unit 204 attempts to verify the kernel signature 306 with use of the kernel verification public key 305, and determines whether the verification of the kernel signature 306 has succeeded. If determining that the verification of the kernel signature 306 has failed (NO in step S406), in step S412, the kernel alteration detection processing unit 204 issues a notification indicating that an alteration to the kernel 212 is detected by displaying an error message on the operation panel 110, and ends the processing illustrated in FIG. 4. If determining that the verification of the kernel signature 306 has succeeded (YES in step S406), the kernel alteration detection processing unit 204 ends the processing thereof while the processing illustrated in FIG. 4 proceeds to step S407. The success in the verification of the kernel signature 306 corresponds to no alteration fount out in the kernel 212.

In step S407, the loader 211 starts up the kernel 212 read in the RAM 103. When being started up, the kernel 212 performs various kinds of initialization processing. Next, the program alteration detection processing unit 205 included in the kernel 212 reads in the native program 213, the Java program verification public key 308, and the native program signature 309 from the flash memory 114 into the RAM 103.

In step S408, the program alteration detection processing unit 205 attempts to verify the native program signature 309 with use of the native program verification public key 307, and determines whether the verification of the native program signature 309 has succeeded. If determining that the verification of the native program signature 309 has failed (NO in step S408), in step S412, the program alteration detection processing unit 205 performs the following processing. That is, the program alteration detection processing unit 205 issues a notification indicating that an alteration to the native program 213 is detected by displaying an error message on the operation panel 110, and ends the processing illustrated in FIG. 4. If determining that the verification of the native program signature 309 has succeeded (YES in step S408), the native program alteration detection processing unit 205 ends the processing thereof while the processing illustrated in FIG. 4 proceeds to step S409. The success in the verification of the native program signature 309 corresponds to detection of no alteration to the native program 213.

In step S409, the kernel 212 starts up the native program 213 including the Java program alteration detection processing unit 206. Next, the Java program alteration detection processing unit 206 reads in the Java program 214 and the hash list 310 from the HDD 104 into the RAM 103. The hash value is stored in the hash list 310. The hash value in the hash list 310 is verification data for verifying that the program is the valid Java program 214, and is a value calculated with use of a hash function. A method for generating the hash list 310 will be described below.

In step S410, the Java program alteration detection processing unit 206 generates a hash value with use of a hash algorithm such as known Secure Hash Algorithm (SHA)-256 with respect to an entire binary code of the Java program 214 to start up. Then, the Java program alteration detection processing unit 206 attempts to verify the Java program 214 to start up based on the generated hash value and the hash list 310. If a filename of the Java program 214 to start up is not contained in the hash list 310, the Java program alteration detection processing unit 206 determines that the verification of the Java program 214 has failed. If the hash value in the hash list 310 that corresponds to the filename of the Java program 214 to start up matches the generated hash value, the Java program alteration detection processing unit 206 determines that the verification of the Java program 214 has succeeded. If the hash value in the hash list 310 that corresponds to the filename of the Java program 214 to start up is different from the generated hash value, the Java program alteration detection processing unit 206 determines that the verification of the Java program 214 has failed. If determining that the verification of the Java program 214 has failed (NO in step S410), in step S412, the Java program alteration detection processing unit 206 performs the following processing. That is, the Java program alteration detection processing unit 206 issues a notification indicating that an alteration to the Java program 214 is detected by displaying an error message on the operation panel 110, and ends the processing illustrated in FIG. 4. If determining that the verification of the Java program 214 has succeeded (YES in step S410), the Java program alteration detection processing unit 206 ends the processing thereof while the processing illustrated in FIG. 4 proceeds to step S411. The success in the verification of the Java program 214 in step S410 corresponds to detection of no alteration to the Java program 214 after the Java program 214 is installed.

In step S411, the native program 213 starts up the Java program 214.

Figure 5:
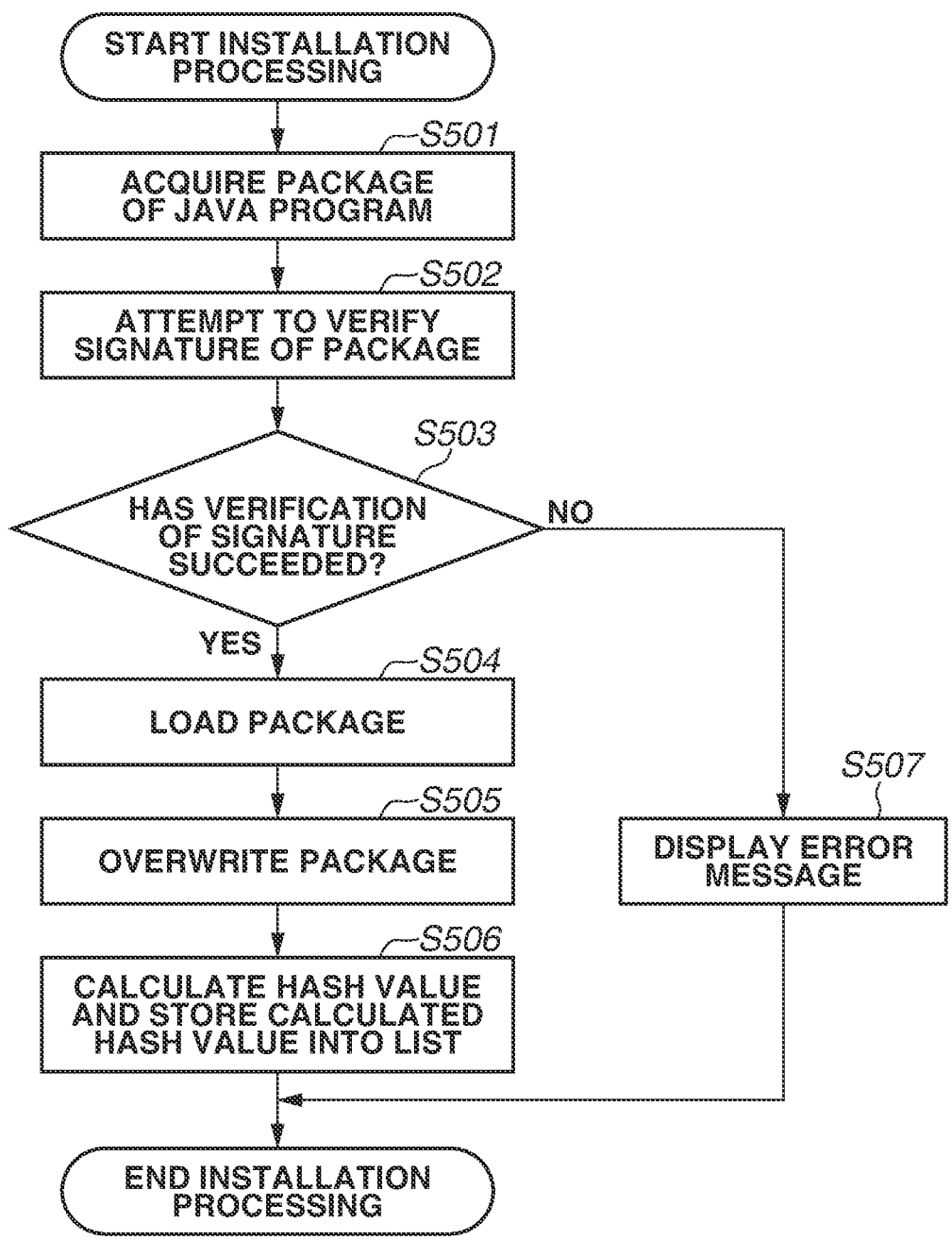
FIG. 5 is a flowchart illustrating one example of installation processing.

Next, processing for installing the Java program 214 into the multifunction peripheral 100 will be described with reference to FIG. 5. FIG. 5 is a flowchart illustrating one example of the processing for installing the Java program 214. The processing illustrated in FIG. 5 is performed by the Java program installation unit 215. The Java program installation unit 215 is one program included in the Java program 214 installed in the multifunction peripheral 100. The Java program installation unit 215 itself is provided with a signature for verification and is executed after being confirmed not to be altered.

The processing illustrated in FIG. 5 is started when the installation of the Java program 214 is instructed with use of the operation panel 110.

In step S501, the Java program installation unit 215 acquires a package of the Java program 214. The Java program installation unit 215 may acquire the package of the Java program 214 by downloading it from a server via the network 120. Alternatively, the Java program installation unit 215 may acquire the package of the Java program 214 from a recording medium such as a universal serial bus (USB) memory connected to a not-illustrated local interface such as a USB.

In step S502, the Java program installation unit 215 attempts to verify a signature of the package of the Java program 214 based on the Java program verification public key 308 and the signature of the package of the Java program 214. The Java program verification public key 308 corresponds to a private key used when the signature of the package of the Java program 214 has been generated. The signature of the package of the Java program 214 is verification data for verifying that this package is a valid package.

In step S503, the Java program installation unit 215 determines whether the verification of the signature added to the package of the Java program 214 has succeeded. If the Java program installation unit 215 determines that the verification of the signature added to the package of the Java program 214 has succeeded (YES in step S503), the processing proceeds to step S504. The success in the verification of the signature added to the package of the Java program 214 corresponds to detection of no alteration to the package of the Java program 214. If the Java program installation unit 215 determines that the verification of the signature added to the package of the Java program 214 has failed (NO in step S503), the processing proceeds to step S507.

In step S504, the Java program installation unit 215 loads the package of the Java program 214 acquired in step S501 into the HDD 104. The package of the Java program 214 may contain another package in a nested state. In this case, the Java program installation unit 215 loads all packages contained in the package of the Java program 214 into the HDD 104. As a result, the operation of the Java program 214 to be installed is sped up compared to when the package contained in the nested state is not loaded.

In step S505, the Java program installation unit 215 overwrites the package loaded in step S504. The overwrite of the package carried out in step S505 is a valid overwrite for allowing the Java program 214 to run by maintaining compatibility of the Java program 214. The overwrite of the package will be described in further detail. An operational environment of the multifunction peripheral 100 may be different from an operational environment originally assumed by the Java program 214 to be installed. In this case, the Java program installation unit 215 overwrites the package loaded in step S504 in such a manner that the Java program 214 becomes compatible with an environment under which the Java program 214 will be executed on the multifunction peripheral 100. This overwrite allows the Java program 214 to normally run on the multifunction peripheral 100. More specifically, the Java program installation unit 215 overwrites a library contained in the package loaded in step S504. This overwrite contributes to absorbing incompatibility of a Java virtual machine (JVM: the Java operational environment) on which the Java program 214 will run, and a difference in a graphic library used for the display on the operation panel 110. Further, the Java program installation unit 215 may overwrite a code of the Java program 214 to install to maintain the compatibility. The Java program installation unit 215 allows previous application assets to be efficiently utilized by overwriting the package in step S505. In step S505, the package corresponding to the Java program 214 to be installed is overwritten. This means that the Java program 214 is overwritten in step S505.

In step S506, the Java program installation unit 215 generates a hash value of the package overwritten in step S505. The hash value calculated at this time is a hash value having a fixed size (for example, 32 bytes) that is calculated with use of the predetermined hash algorithm such as SHA-256 from the package of the Java program 214. Even with a difference of only one bit in the data of the package based on which the calculation is carried out, a different hash value is generated. Further, the hash value has unidirectionality that prohibits the original data from being estimated from the hash value, and therefore can be used to detect an alteration to the Java program 214. The Java program installation unit 215 adds, into the hash list 310, data containing the filename of the Java program 214 to install and the calculated hash value in association with each other. Then, the Java program installation unit 215 ends the processing illustrated in FIG. 5. The hash list 310 updated in step S506 is used in the verification of the Java program 214 that is carried out in step S410 illustrated in FIG. 4. The installation of the Java program 214 corresponding to the package acquired in step S501 into the multifunction peripheral 100 is completed by the processing in step S506.

In step S507, the Java program installation unit 215 issues a notification indicating that the package of the Java program 214 has been altered by displaying an error message on the operation panel 110, and ends the processing illustrated in FIG. 5.

Next, the hash list 310 will be descried. The hash list 310 is a list that allows the multifunction peripheral 100 to verify whether the installed Java program 214 is a valid program. The hash list 310 is a list that contains one or more pieces of data in which the filename of the Java program 214 and the hash value are associated with each other. The following table, a table 1 indicates an example of a structure of the hash list 310.

TABLE 1

| Java Program 1 | Hash Value 1 |
| Java Program 2 | Hash Value 2 |
| Java Program 3 | Hash Value 3 |
| ... | ... |

When starting up an arbitrary program that is the Java program 214 installed in the multifunction peripheral 100, the native program 213 first searches for a row in the hash list 310 that has a name in the first column matching the filename of the Java program 214 to start up. Then, the native program 213 acquires the hash value in the second column in the searched row in the hash list 310. By this operation, the native program 213 can acquire the correct hash value of the Java program 214 to start up.

The hash list 310 may also be altered. Then, the Java program installation unit 215 adds a signature to the hash list 310 itself to protect the hash list 310. When the signature is added to the hash list 310, the private key should be held within the multifunction peripheral 100. The multifunction peripheral 100 stores the private key with use of hardware such as a trusted platform module (TPM). As a result, the multifunction peripheral 100 can safely hold the private key. The hash list 310 may be stored in a safe server outside the multifunction peripheral 100. The hash list 310 may be held in any manner as long as it can be prevented from being altered, and details of the method for managing the hash list 310 will be omitted herein.

Further, the hash list 310 is not limited to the file structured as illustrated in the table 1, and may be a data set (a database) managed by a commonly-used database management system.

In the above-described manner, the multifunction peripheral 100 overwrites the package so as to allow the Java program 214 to normally run on the multifunction peripheral 100 in step S505 illustrated in FIG. 5 when installing the Java program 214. As a result, the multifunction peripheral 100 can ensure the operational compatibility with the previous program, and allows the previous application assets to be efficiently utilized. Further, in step S506 illustrated in FIG. 5, the multifunction peripheral 100 calculates the hash value of the package overwritten in step S505, and updates the hash list 310. As a result, the multifunction peripheral 100 can prevent the program overwritten to maintain the compatibility from being incorrectly detected as the altered program despite no alteration made thereto actually, thereby correctly carrying out the alteration detection.

Further, when any of the BIOS 210, the loader 211, the kernel 212, the native program 213, and the Java program 214 is altered, the multifunction peripheral 100 can detect the alteration without use of a tamper-resistant module.

Next, a second exemplary embodiment will be described. The second exemplary embodiment will be described, omitting descriptions of features shared with the first exemplary embodiment, and focusing on differences from the first exemplary embodiment. Further, similar components to the first exemplary embodiment will be identified with use of the same reference numerals, and detailed descriptions thereof will be omitted below.

In the first exemplary embodiment, the multifunction peripheral 100 is configured to use the hash value as the verification data for detecting an alteration to the Java program 214, and be able to detect the alteration based on whether the hash value matches the valid hash value registered with the hash list 310. However, the method for detecting the alteration can also be realized with use of the signature instead of the hash value. In the second exemplary embodiment, this method will be described.

Figure 7:
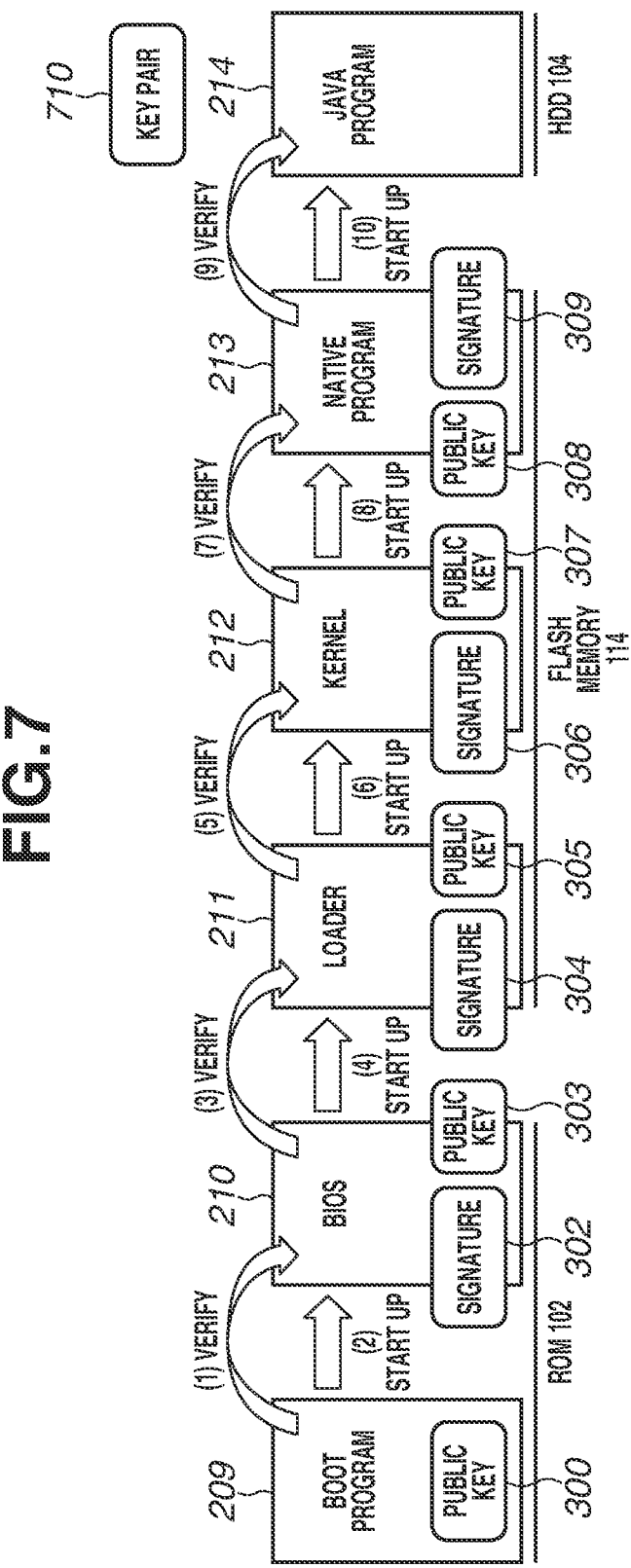
FIG. 7 illustrates one example of a flow of processing for starting up the multifunction peripheral.

Next, a flow of processing for starting up the multifunction peripheral 100 according to the second exemplary embodiment while carrying out the alteration detection will be described with reference to FIG. 7. FIG. 7 is a schematic view illustrating one example of the flow of the processing for starting up the multifunction peripheral 100. In the second exemplary embodiment, the boot program 209 starts up the BIOS 210, the BIOS 210 starts up the loader 211, and the loader 211 starts up the kernel 212, similarly to the first exemplary embodiment described with reference to FIG. 3B. Then, the kernel 212 starts up the native program 213, and the native program 213 starts up the Java program 214. In this example, each of the programs starts up the program targeted for the startup if having succeeded in the verification of the program targeted for the startup.

A difference in FIG. 7 from FIG. 3B is that a key pair 710 is used instead of the hash list 310 in FIG. 7. The key pair 710 includes a private key and a public key according to an encryption method using a public key cryptosystem. The key pair 710 is used to generate and verify the signature after the Java program 214 is overwritten. Further, the key pair 710 is different for each multifunction peripheral 100. The public key in the key pair 710 corresponds to the private key in the key pair 710.

Figure 6:
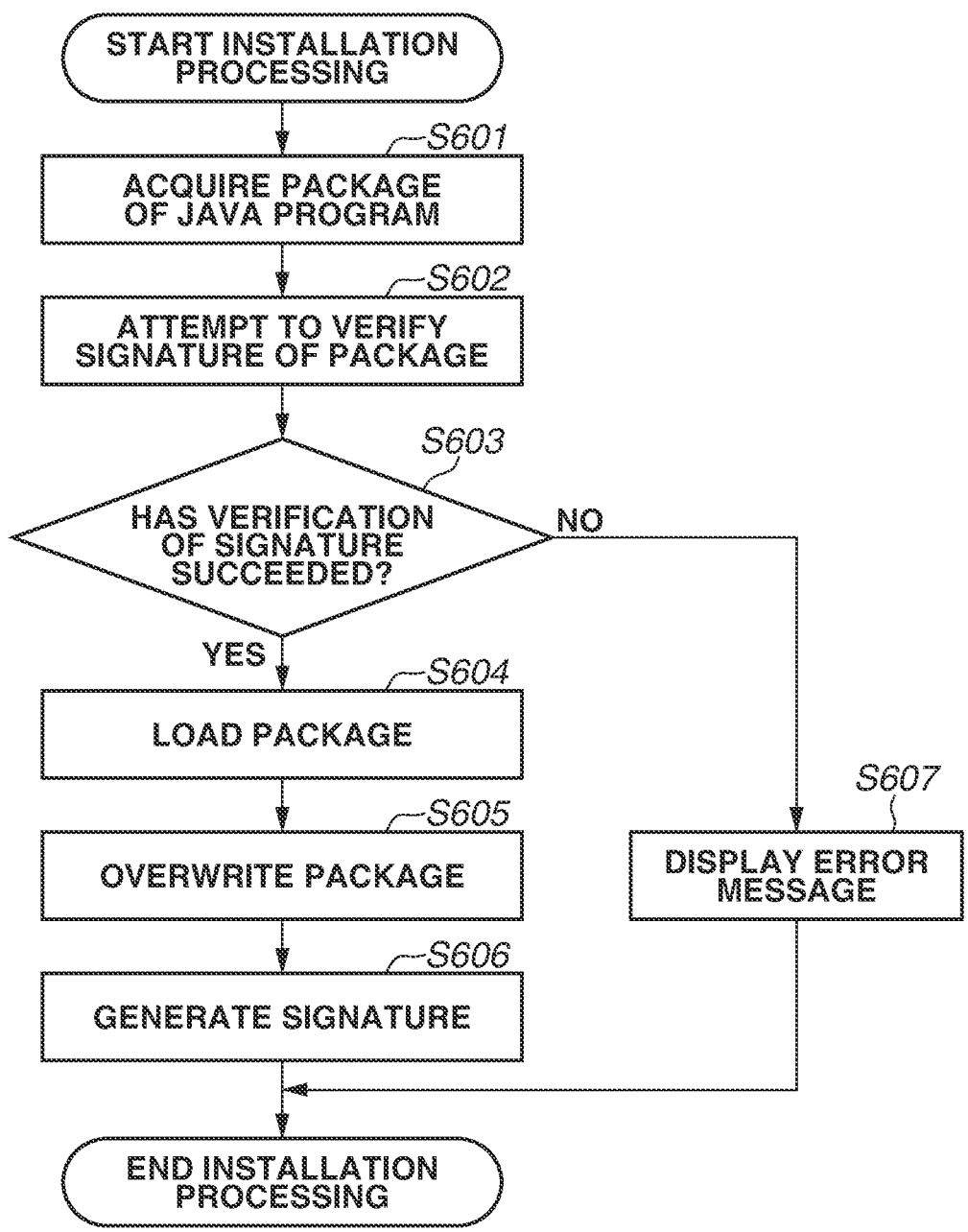
FIG. 6 is a flowchart illustrating one example of installation processing.

Next, processing for installing the Java program 214 into the multifunction peripheral 100 will be described with reference to FIG. 6. FIG. 6 is a flowchart illustrating one example of the processing for installing the Java program 214.

Processing in step S601 to step S605 is similar to the processing in step S501 to step S505 illustrated in FIG. 5. Processing in step S607 is similar to the processing in step S507 illustrated in FIG. 5.

In step S606, the Java program installation unit 215 generates the signature of the package overwritten in step S605 with use of the private key in the key pair 710, and adds it to the package.

A leak of the private key in the key pair 710, if happens, makes unauthorized generation of the signature possible. The multifunction peripheral 100 stores the private key with use of the hardware such as the TPM. As a result, the multifunction peripheral 100 can safely hold the private key.

The Java program 214 installed in the processing illustrated in FIG. 6 is started up by the native program 213 in the processing in steps S410 and S411 illustrated in FIG. 4. However, in the second exemplary embodiment, the processing in step S410 is performed in the following manner.

In step S410 in the second exemplary embodiment, the Java program alteration detection processing unit 206 attempts to verify the signature added to the package of the Java program 214 in step S606 with use of the public key in the key pair 710. Then, the Java program alteration detection processing unit 206 determines whether the verification of the Java program 214 has succeeded. If determining that the verification of the Java program 214 has failed (NO in step S410), in step S412, the Java program alteration detection processing unit 206 displays an error message on the operation panel 110 and ends the processing illustrated in FIG. 4. If determining that the verification of the Java program 214 has succeeded (YES in step S410), the Java program alteration detection processing unit 206 ends the processing thereof while the processing illustrated in FIG. 4 proceeds to step S411.

In the above-described manner, in the second exemplary embodiment, the multifunction peripheral 100 also prevents the program overwritten to maintain the compatibility from being incorrectly detected as the altered program despite no alteration made thereto actually, similarly to the first exemplary embodiment. Then, the multifunction peripheral 100 can correctly carry out the alteration detection with respect to the program overwritten to maintain the compatibility.

(Exemplary Modifications)

In the above-described exemplary embodiments, the public key has been described assuming that all of public keys to be employed are different from one another, but some of them may be the same. Further, the location where each of the programs is stored has been described assuming that the examples thereof include the ROM 102, the flash memory 114, and the HDD 104, but this description is not intended to limit the storage location and the storage location may be another storage medium. Furthermore, the location where the program is stored does not have to be placed at the described portion, and, for example, the multifunction peripheral 100 may be configured to store the loader 211 in the ROM 102.

Other Exemplary Embodiments

Embodiments can also be provided by processing that supplies a program capable of realizing one or more functions of the above-described exemplary embodiments to a system or an apparatus via a network or a storage medium, and causes one or more processors in a computer of this system or apparatus to read out and execute the program. Further, embodiments can also be provided by a circuit (for example, an application specific integrated circuit (ASIC)) capable of realizing one or more functions.

The above-described exemplary embodiments merely indicate examples. The technical scope of the present disclosure shall not be construed limitedly by them. Embodiments can be implemented in various manners without departing from the technical scope or the main features of the present disclosure.

For example, as the hardware configuration of the multifunction peripheral 100, the multifunction peripheral 100 may include a plurality of CPUs and may be configured in such a manner that the plurality of CPUs performs the processing based on a program stored in an HDD or the like of each device. Further, as the hardware configuration of the multifunction peripheral 100, the multifunction peripheral 100 may be configured to use a graphics processing unit (GPU) instead of the CPU. A part of the software configuration may be implemented as the hardware of the multifunction peripheral 100. Further, the above-described exemplary embodiments may also be arbitrarily combined.

According to the present exemplary embodiments, the program overwritten to maintain the compatibility can be prevented from being incorrectly detected as the altered program despite no alteration made thereto actually.

A part of programs runs by being installed in the information processing apparatus as external software. Some of such programs are created by a third party, and the present exemplary embodiments can meet such uses that users want to allow the previous program to also run by maintaining the compatibility.

When a change or the like is made to a platform of the information processing apparatus on which a program runs, this change may lead to a failure to maintain compatibility with, for example, a library contained in this program. For example, when a change is made to specifications relating to graphics, the program may be unable to run normally if being kept in an original state. In such a case, the program may be able to run normally by making a modification to this program. More specifically, the program may be able to run normally by replacing the library contained in this program with a library capable of guaranteeing the compatibility. This replacement is conducted when the program is installed into the information processing apparatus. However, such an overwritten program may be incorrectly detected as the altered program, and this is becoming an issue in light of maintaining the compatibility as described above. The present exemplary embodiments can solve the above-described issue.

According to the above-described exemplary embodiments, the program overwritten to maintain the compatibility can be prevented from being incorrectly detected as the altered program despite no alteration made thereto actually.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-179774, filed Sep. 26, 2018, which is hereby incorporated by reference herein in its entirety.

What is claimed is:

1. An information processing apparatus comprising:
one or more processors; and
one or more memories which store instructions executable by the one or more processors to cause the information processing apparatus to function as:

an acquisition unit configured to acquire a first program;
a first verification unit configured to verify the first program acquired by the acquisition unit based on first verification data;
an installation unit configured to install a first modified program acquired by the acquisition unit after modifying the first program so as to make the first modified program compatible with an operational environment on the information processing apparatus in a case where the verification of the first program is succeeded by the first verification unit;
a generation unit configured to generate second verification data based on the first modified program installed by the installation unit;
a second verification unit configured to verify the first modified program after the installation of the first modified program based on the second verification data generated by the generation unit; and
a first control unit configured to perform control so as to start up the first modified program in a case where the verification of the first modified program is succeeded by the second verification unit.

2. The information processing apparatus according to claim 1, further comprising a second control unit configured to perform control so as not to start up the first modified program in a case where the verification of the first modified program is not succeeded by the second verification unit.

3. The information processing apparatus according to claim 1, further comprising a notification unit configured to issue a notification indicating that the first program is altered in a case where the verification of the first modified program is not succeeded by the second verification.

4. The information processing apparatus according to claim 1, wherein the installation unit does not install the first program in a case where the verification of the first program is not succeeded by the first verification unit.

5. The information processing apparatus according to claim 1, wherein the information processing apparatus is a multifunction peripheral, and the first modified program is to a control program of the multifunction peripheral.

6. The information processing apparatus according to claim 1, wherein the installation unit,
wherein the first verification unit verifies the first program acquired by the acquisition unit based on a digital signature as the first verification data and a first public key corresponding to a first private key, and
wherein the first verification data is generated based on the first private key.

7. The information processing apparatus according to claim 1, wherein the modifying the first program is overwriting a code of the first program.

8. The information processing apparatus according to claim 1, wherein the second verification unit detects alteration to the first modified program after the installation of the first modified program based on the second verification data generated by the generation unit.

9. The information processing apparatus according to claim 8,
wherein the generation unit generates a hash value as the second verification data based on the first modified program installed by the installation unit, and
wherein the second verification unit detects the alteration to the first modified program after the installation based on a hash value generated based on the first modified program installed by the installation unit and the hash value generated by the generation unit.

10. The information processing apparatus according to claim 8, wherein the generation unit generates a digital signature as the second verification data based on the first modified program installed by the installation unit and a second private key, and the second verification unit detects the alteration to the first program after the installation based on the digital signature generated by the generation unit and a second public key corresponding to the second private key.

11. A method for controlling an information processing apparatus, the method comprising causing a computer to perform processing including:
acquiring a first program;
verifying the first program acquired by the acquiring based on first verification data;
installing the first modified program acquired by the acquiring after modifying the first program so as to make the first modified program compatible with an operational environment on the information processing apparatus in a case where the verification of the first program is succeeds;
generating second verification data based on the first modified program installed by the installing;
verifying the first modified program after the installing of the first modified program based on the second verification data generated by the generating; and
performing control so as to start up the first modified program in a case where the verification of the first modified program is succeeds.

12. The method according to claim 11,
wherein the verifying the first program acquired by the acquiring based on the first verification data is verifying the first program acquired by the acquiring based on a digital signature as the first verification data and a first public key corresponding to a first private key, and
wherein the first verification data is generated based on the first private key.

13. The method according to claim 11, wherein the modifying the first program is overwriting a code of the first program.

14. The method according to claim 11, wherein the verifying the first modified program after the installing of the first modified program based on the second verification data generated by the generating is detecting alternation to the first program after the installing based on the second verification data generated by the generating.

15. A non-transitory computer-readable storage medium storing a control program for causing a computer to perform a method for controlling an information processing apparatus, the method comprising:
acquiring a first program;
verifying the first program acquired by the acquiring based on first verification data;
installing the first modified program acquired by the acquiring after modifying the first program so as to make the first modified program compatible with an operational environment on the information processing apparatus in a case where the verification of the first program is succeeds;
generating second verification data based on the first modified program installed by the installing;
verifying the first modified program after the installing of the first modified program based on the second verification data generated by the generating; and
performing control so as to start up the first modified program in a case where the verification of the first modified program is succeeds.

16. The non-transitory computer readable storage medium according to claim 15,
 wherein the verifying the first program acquired by the acquiring based on the first verification data is verifying the first program acquired by the acquiring based on a digital signature as the first verification data and a first public key corresponding to a first private key, and
 wherein the first verification data is generated based on the first private key.

17. The non-transitory computer readable storage medium according to claim 15, wherein the modifying the first program is overwriting a code of the first program.

18. The non-transitory computer readable storage medium according to claim 15, wherein the verifying the first modified program after the installing of the first modified program based on the second verification data generated by the generating is detecting alternation to the first program after the installing based on the second verification data generated by the generating.

* * * * *